July 22, 1930.   J. W. WELLS   1,770,960
PLUMBING SERVICE CLAMP
Filed Oct. 29, 1926
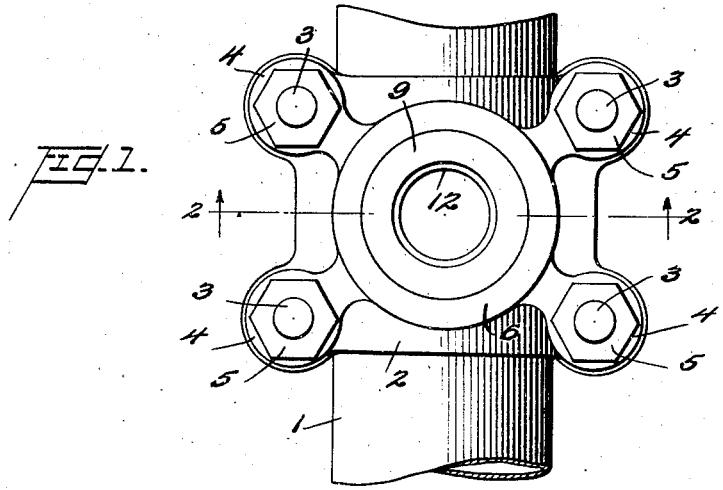
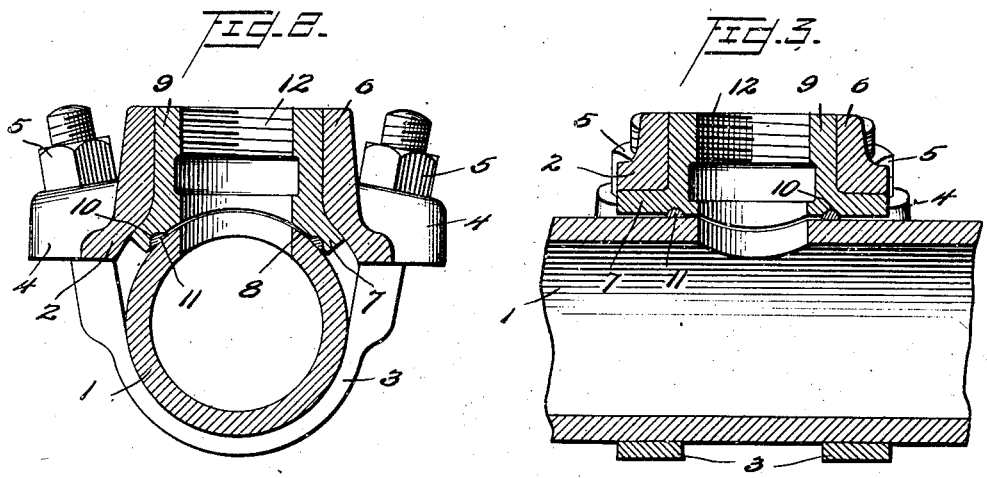
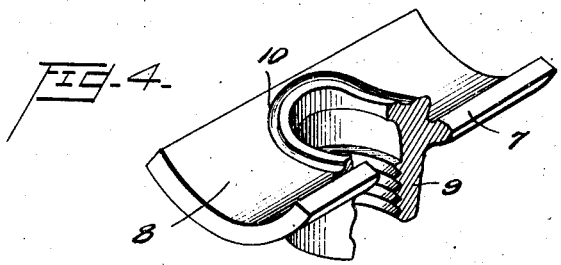
Inventor
Jewell W. Wells
By Cushman Bryant Darby
Attorneys Patented July 22, 1930

1,770,960

UNITED STATES PATENT OFFICE

JEWELL W. WELLS, OF DECATUR, ILLINOIS, ASSIGNOR, BY MESNE ASSIGNMENTS, TO MUELLER CO., OF DECATUR, ILLINOIS, A CORPORATION OF ILLINOIS

PLUMBING SERVICE CLAMP

Application filed October 29, 1926. Serial No. 145,006.

The present invention relates to improvements in plumbing service clamps which are employed in tapping water or gas mains.

Where a water or gas main to be tapped is of such light weight material, or has, from long use, so deteriorated as not to have sufficient strength to be properly engaged by a tap or branch or to bear the weight of a service pipe, it is customary to employ what is known to the trade as a "service clamp".

Such clamps comprise essentially a saddle like member or body which is adapted to be applied and conform substantially to the curvature of the main, said saddle member having a lateral bore adapted to receive the branch pipe, and clamping means for securely fastening such saddle in position on a main.

The body members of such clamps are commonly constructed of malleable iron. While clamps of this material are entirely satisfactory from the standpoint of possessing the desired strength and being relatively inexpensive, they are objectionable or inefficient for use with mains containing fluid under relatively high pressures. The malleable iron castings composing the bodies of the clamps are of such a porous nature that fluid under high pressure frequently escapes therethrough from the mains to which such clamps are applied.

One of the objects of the present invention is to provide a service clamp which will be free from the objection noted and will positively prevent any leakage of fluid through the wall of the clamp.

With this and other ends in view, the invention consists in the construction that will be hereinafter more particularly described, reference being had to the accompanying drawing in which:

Figure 1 is a plan of a service clamp, constructed in accordance with the present invention, shown in position on a main;

Figure 2 is a transverse sectional view substantially on the line 2—2 of Figure 1.

Figure 3 is a longitudinal section on the line 3—3 of Figure 2.

Figure 4 is a detail perspective view of the improved bushing in inverted position.

Referring to the drawing in the several figures of which like reference characters indicate corresponding parts, 1 designates a main such as is commonly employed for gas, water or other fluid under pressure.

The saddle member 2 of the improved service clamp is preferably made of malleable iron and is secured in position upon the main 1, by straps 3, which embrace the main and have their threaded ends extending through lugs 4, and engaged by nuts 5, by means of which the clamp may be securely fastened to the main. The saddle member is provided as usual with a lateral bore 6, to receive the branch pipe.

According to the present invention, the saddle member 2 of the service clamp does not directly contact with the main 1, to which it is applied but an intermediate lining of brass, or other metal which is impervious to the passage of fluid under pressure, is provided.

This bushing comprises a body 7, having a concave inner face or surface 8, which will conform to the contour of the main to which the clamp is applied, and an aperture or opening in alignment with the branch pipe bore of the saddle 2. As shown, the bushing body includes a tubular projection 9, which extends into the branch pipe bore 6, of the saddle member 2.

In the concave surface 8, of the bushing member is provided an annular seat 10, to receive the usual soft metal gasket 11, which is provided for preventing any possible leakage by reason of inequalities in the meeting surfaces of the main and service clamp.

The tubular portion 9, of the bushing extends throughout the length of the branch pipe bore of the saddle member 2, and adjacent its outer end it is interiorly threaded to provide a ready means for effecting attachment of the branch pipe.

From the foregoing description and the drawing, it will be seen that the invention provides a plumbing service clamp which includes a lining or bushing of metal impervious to the passage of fluid under pressure about the inlet opening thereof and interiorly of the bore in which the branch pipe is received. The improved clamp will therefore completely overcome the objection to similar devices as commonly constructed hereinbefore referred to.

The bushings may be made and sold as articles of manufacture separate from the clamp bodies or, if preferred, such bushings may be incorporated with the clamp bodies at the time of making the latter.

If preferred, the lining may be cast into a suitable recess formed in the saddle member.

Having thus described the invention, what is claimed is:

1. The combination with a plumbing service clamp comprising a body, provided with a lateral bore to receive a branch pipe, and means for securing said body to a main, of a brass bushing arranged against the inner face of the clamp body about the bore opening therein, so that it will lie between and in contact with said body and a main to which the clamp is applied, and having an aperture in alignment with said bore.

2. The combination with a plumbing service clamp comprising a body, provided with a lateral bore to receive a branch pipe, and means for securing said body to a main, of a bushing of metal impervious to the passage of fluid under pressure arranged against the inner face of the clamp body about the bore opening therein, so that it will lie between and in contact with said body and a main to which the clamp is applied, and having a tubular portion that extends into said bore.

3. In a plumbing service clamp the combination of a malleable iron saddle member provided with a lateral bore to receive a branch pipe, straps adjustably connected to said saddle member and adapted to embrace a main to which the clamp is to be secured, a bushing of metal impervious to the passage of fluid under pressure adapted to be positioned between the main to which the clamp is to be applied and the saddle member and having a tubular projection that will extend into the branch pipe bore of the saddle member, said tubular bushing being interiorly threaded adjacent its outer end, and an annular shaped soft metal gasket surrounding the inner end of the tubular bushing, whereby it will be compressed between the bushing and a main when the clamp is secured in position thereon.

In testimony whereof I have hereunto set my hand.

JEWELL W. WELLS.